United States Patent [19]
Berra

[11] Patent Number: 5,280,271
[45] Date of Patent: Jan. 18, 1994

[54] EMERGENCY ACTION PLAN DISPLAY

[76] Inventor: John Berra, 333 N. Belt, Suite 230, Houston, Tex. 77060

[21] Appl. No.: 549,955

[22] Filed: Jul. 9, 1990

[51] Int. Cl.⁵ .......................................... G08B 25/00
[52] U.S. Cl. .............................. 340/525; 340/815.12; 340/286.11
[58] Field of Search .................. 340/525, 721, 815.02, 340/815.12, 815.06, 286.01, 286.11, 286.14

[56] References Cited

U.S. PATENT DOCUMENTS

| | | | |
|---|---|---|---|
| 3,171,114 | 2/1965 | Butler et al. | 340/525 |
| 3,624,648 | 11/1971 | Willoughby | 340/525 |
| 3,810,138 | 5/1974 | Thompson et al. | 340/525 |
| 4,816,208 | 3/1989 | Woods et al. | 340/525 |

*Primary Examiner*—Donnie L. Crosland
*Attorney, Agent, or Firm*—Harrison & Egbert

[57] ABSTRACT

An emergency action plan comprising: a display, an emergency icon illustrated at the top of the display for identifying an emergency condition, a plurality of action lines extending downwardly on the display from the emergency icon for directing the steps to be taken in an emergency condition, a plurality of team member blocks of desired color, and a plurality of action indicators connected by action lines to the team member blocks. The importance of a team member block in relation to another team member block corresponds to the brightness of the color of the team member block, the team member block of most importance being positioned in the middle of the display. The action indicators have a color corresponding to the color of the particular team member block to which it is connected. The action indicators comprise an action step block characterized by an enclosed geometric shape, a decision step block characterized by a triangular geometric shape, and a stop action block characterized by an octagonal geometric shape. The action indicators are positioned horizontally to the side of a solid thick action line extending vertically downwardly from a team member block.

20 Claims, 3 Drawing Sheets

EMERGENCY ACTION PLAN DISPLAY

TECHNICAL FIELD

The present invention relates to displays. More particularly, the present invention relates to flow charts and diagrams that provide useful information on displays. More particularly, the present invention relates to flowcharts that enhance the ability to carry out emergency procedures during emergency conditions.

BACKGROUND ART

Over the years, it has come to be a necessary component of corporate strategy to devise emergency action plans. The Exxon Valdez spill in Alaska and the Phillips Petroleum explosion in Houston, Tex. have shown many companies that a great need exists for emergency action plans. When an emergency condition occurs, it is necessary to respond both to the public and to public authorities as quickly, efficiently, and accurately as possible. This task becomes greatly hampered by inadequate emergency action plans.

In the past, emergency action plans have been devised that provide large notebooks full of information. Many times, emergency action plans are up to 500 pages in length. Once such lengthy emergency action plans are developed, they are seldom, if ever, changed to reflect new or different situations. Also, when the emergency action plan is a lengthy description in a notebook, the emergency condition, in itself, impedes ones ability to accurately and efficiently carry out the emergency procedures detailed in the notebook. Too often, such notebooks remain buried on the desks of persons on the emergency action teams. These emergency procedures, since they are not used very often, are seldom reviewed for accuracy or for necessity. Many times, personnel changes make it very difficult to keep an updated emergency action plan. If the individual in charge of an emergency action procedure leaves the company, then a substitute may not be found until an emergency actually occurs. Often, the position as an emergency team leader is not included in one's job description and one only learns of the position after the emergency occurs.

Many times, individuals move up in the corporation so as to assume new positions. When the emergency action procedures are based upon the names of the individuals, or their titles, such a change in position can either eliminate the team leader's authority or change that authority substantially. As such, when an emergency procedure is necessary, these prior written emergency procedure manuals are outdated and ineffective. Since they are outdated, the procedures stated therein are generally ineffective and must be corrected during times of emergency procedures. It is imperative that one emergency action team not work at cross-purposes with or in duplicity with another emergency action team. Without the proper emergency action plan, such cross purposes and duplicity are inherent.

In the case of recent emergency procedures, it is imperative that one emergency action team realize its authority and position with respect to other emergency action teams. When the emergency procedures are simply reflected in the pages of a notebook, the interrelationships between the emergency action teams are not very apparent. Oftentimes, one emergency action team will assume authority over another team when actually the positions of authority should have been reversed. Furthermore, the interactions between the various teams are not very apparent when simply stated in notebook format. Therefore, when an emergency occurs, and if the emergency procedures are reflected in the emergency procedures notebook of a company, the actual interrelationships of the emergency action teams may be lost, confused, or seen unduly complex.

Recently, Congress has adopted many new laws in an effort to control the spillage of oil in offshore waters and the spillage of contaminants on land. Further enactments have spurred the efforts to control the accidental dispersing of hazardous waste. New legislation will make greater effort to prevent the type of explosion that took many lives in the Phillips Petroleum accident in Houston, Tex.

It has long been known that color-coding can emphasize and deemphasize the significance of the items to which the color coding is attached. In the past, it would have been possible to design emergency action plans on color-coded charts. Unfortunately, the creation of a color-coded chart is an extremely expensive printing job. If a four color printing process is required for the color-coded emergency action plan, then, in the past, the cost for creating the chart would have been excessive. Additionally, typesetting and reformatting of the presses would be necessary whenever an individual changed positions, left the company, or whenever the emergency action procedure was changed. Clearly, in the past, the ability to produce charts for emergency action plans has been seriously impeded by the inability to quickly, easily, and inexpensively illustrate and convey information in color.

It is an object of the present invention to provide an emergency action plan display that quickly and easily conveys the duties to be performed by emergency action teams during times of emergency.

It is another object of the present invention to provide an emergency action plan display in which the relative importance of the duties to be performed are color-coded.

It is a further object of the present invention to provide an emergency action plan display in which the information for external resources and internal communication can be quickly and easily changed, altered, or removed from the display.

It is still a further object of the present invention to provide an emergency action plan display that quickly conveys the information necessary concerning the interrelationships of the various emergency action teams.

It is still a further object of the present invention to provide an emergency action plan display that can be produced quickly, easily and in multiple copies.

These and other objects and advantages of the present invention will become apparent from a reading of the attached specification and appended claims.

SUMMARY OF THE INVENTION

The present invention is an emergency action plan for coordinating the activities of emergency action teams during emergency conditions that comprises a display, an emergency icon illustrated on the display for the identification of the emergency condition, a plurality of action lines extending downwardly on the display from the emergency icon, a plurality of team member blocks connected to the action lines on the display for indicating the person of responsibility for a particular task, and a plurality of action indicators connected by action lines to the team member blocks. The action lines serve to direct the steps to be carried out during emergency conditions. The action indicators inform the emergency action team of the particular task to be performed by the person of responsibility in the emergency conditions.

Each of the team member blocks has a generally rectangular shape. These team member blocks vary in visual prominence relative to the importance of the emergency action team during the emergency condition. The most important of the team member blocks is positioned in the middle of the display. The most important of the team member blocks has a rectangular block shape with a shading along one surface of the rectangular block shape. Each of the team member blocks has a header area containing the title of the person of responsibility identified as the team leader in the team member block. The second and third most important team member blocks are positioned on the left and right sides of the display on opposite sides of the team member block of the most important emergency action team. The importance of the emergency action team is identified in the team member block by the brightness of color.

The plurality of action lines comprises a solid thick action line extending vertically downward on the display from one of the team member blocks. The action indicators extend horizontally outwardly from the solid thick action line below the team member blocks. The action indicators extend outwardly from the solid thick action line and have a color matching the color of the team member block to which they are connected.

The action indicators comprise an action step block characterized by an enclosed geometric shape for describing the action to be taken during the emergency condition. The action indicator also comprises a decision step block that is characterized by a different enclosed geometric shape than the action step block. The decision step blocks indicates the nature of the decision to be made in the emergency condition. The action indicator further comprises a stop action block that is characterized by a different geometric shape than the action step block. This stop action block indicates the need to take no action of a particular type during the emergency condition. Specifically, the action step block comprises parallel top and bottom lines with intersecting diagonal lines at the ends of the parallel top and bottom lines. The action step block has a color matching the color of the team member block from which it extends. The decision step block is in the shape of a triangle. The stop action block has the shape of an octagon or the shape of a stop sign. The action indicators are more brightly colored toward the middle of the display than on the sides of the display. Since those action indicators in the middle of the display correspond to the most important of the emergency action teams, such action indicators would, naturally, have a more brightly colored appearance.

The display of the present invention further includes an alternate team member block of rectangular shape that is positioned on the display adjacent one of the plurality of team member blocks. This alternate team member block is connected by a broken line to one of the team member blocks. Also, a non-team member block of rectangular shape is connected by an action line to an action indicator. This non-team member block is characterized by a top stripe of cross-hatched color of a different color than the color of the action indicator to which it is connected.

Each of the colored portions of the emergency action plan is plotted on an electrostatic plotter and prepared through a computer-aided design computer program.

DETAILED DESCRIPTION OF THE INVENTION

Figure 1:
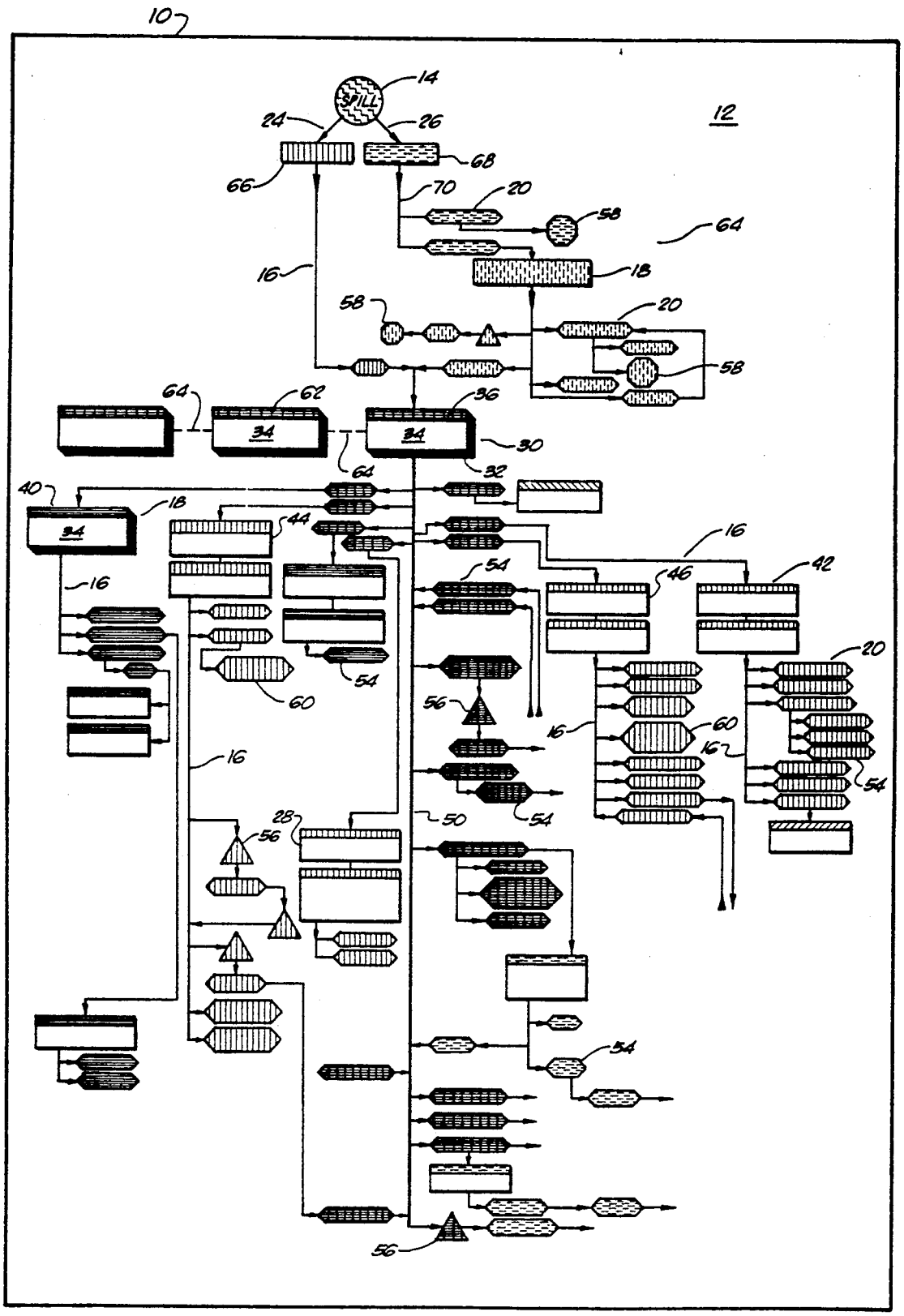
FIG. 1 shows the emergency action plan of the present invention in accordance with the preferred embodiment of the present invention.

Referring to FIG. 1, there is shown at 10 the emergency action plan in accordance with the preferred embodiment of the present invention. The emergency action plan 10 comprises display 12, the emergency icon 14, action lines 16, team member blocks 18, and action indicators 20. Since a very large number of the action lines, team member blocks, and action indicators appear in FIG. 1, only a few of these components of the present invention are actually marked with the above-referenced numeral for the purposes of clarity.

Display 12 is a large sheet of paper, plastic, or plastic-coated paper. The size of the display 12 should be sufficient so as to display the entirety of the emergency action plan 10 of the present invention. Display 12 preferably has a rectangular shape. Display 12 should have a configuration suitable for wall hanging, or for pedestal display. It is the intention of the present invention that the emergency action plan 10 of the present invention should be suitable for display and for continued viewing. The display of the emergency action plan 10 should be available for viewing, as required, in the event of such an emergency situation.

Display 12 is prepared by computer-aided design (CAD). In particular, a computer program 18 devised that can plot each of the components onto the display 12. Importantly, the emergency action 10 of the present invention is plotted in color. The display 12 includes all of the aforementioned components that indicate team members, interactions among team members, action steps, decision steps, and "do-not-do" stop steps. These interactions are displayed by the team member blocks 18, by the action line 16, and by the action indicators 20.

In the preferred embodiment of the present invention, the color master of display 12 is an original plot on a sheet 24 inches by 36 inches (or 22 inches by 34 inches). Of course, the size is simply a matter of design choice and should not be construed as a limitation on the present invention. Importantly, however, to obtain the significant and unique benefits of the present invention, the display 12 should have a size greater than ledger size sheets of 11 inches by 17 inches. Multiple quantity original plots in color may be made on electrostatic plotters. There is no other existing technology presently available to produce such color plots on paper of this size. Electrostatic plotters are of a type produced by Precision Image, Inc. of Dallas, Tex.

At the top of display 12 in the emergency action plan 10 is the emergency icon 14. Emergency icon 14 is of a type suitable for identifying the type of emergency condition to which the emergency action plan 10 applies. For example, the emergency action plan can be developed for emergencies such as oil spills, fires, explosions, gas releases, medical rescues, hurricanes, floods, and natural disasters. For the purposes of illustration, the emergency icon 14 shown on display 12 of emergency action plan 10 is for an oil spill. The oil spill is graphically illustrated in a circle having staircased cross-hatchings. It can be seen that the emergency action lines 24 and 26 extend downwardly from emergency icon 14 at angles. The emergency action line 24 indicates one direction of action following a spill. The action line 26 indicates the other course of action following an oil spill. The flow path of the emergency action plan 10 will eventually develop out of these initial emergency action lines. As can be seen in FIG. 1, the emergency action lines extend downwardly on the display from the emergency icon 14. These action lines serve to direct the steps to be carried out in the emergency condition indicated in the emergency icon 14. Each of the action lines 16 includes an arrow which shows the action pathway.

The team member blocks 18 are connected to the action lines 16 on the display 12. These team member blocks 18 are for identifying the emergency action team and the person of responsibility for the particular task to be carried out in an emergency condition by the particular emergency action team. The team member blocks are indicated with rectangular shapes 28. The term "team member blocks" is used rather loosely as a definition for such blocks. In many situations, the rectangular blocks, as illustrated in emergency action plan 10, correspond to an outside resource, to a generic group of people, or to single individuals. As used herein, the term team member block, refers to, in general, a person or group of persons responsible for some activity during the emergency condition. The most important team member block 30 is shown in the largest rectangular block and has a heavy, wide shading around the rectangular block. The most important team member block 30 is positioned in the middle of the display 12. The heavy wide shading band is illustrated at 32 in FIG. 1. The top of each of the team member blocks 18 has a thin band with a header color that contains the "response" title of the response team member indicated in the blank area 34 of team member blocks 18.

During any emergency, certain emergency action teams play a more prominent role than other teams. Certain teams are responsible for leadership and action. Other emergency action teams are dedicated to response, surveillance, or reporting. Quite clearly, those teams that are responsible for action during an emergency would assume the role of prominence among the many emergency action teams represented on emergency action plan 10. As a result of the need to identify the various levels of importance during the emergency situation, a unique aspect of the present invention has been to identify the most important teams with the most prominent color. For example, as illustrated in FIG. 1, the leader of the most important team is indicated by the rectangular block with heavy shading at 30. In addition, to emphasize the prominence of the team leader identified in the open area 32 of block 30, a solid yellow color is utilized as the header band 36 in block 30. The solid yellow color is the most prominent color available for drawing attention to that area of the block. After experimentation, it was found that human eyes tend to gravitate toward a yellow color, especially a bright yellow color, when used in a display. The open area 34 of team member blocks 18 is uncolored and contains the name, company name, office phone number, home phone number, beeper number, cellular phone number and other information of the leader of the emergency action team. As will be described hereinafter, the information is contained in this uncolored area 34 allows quick access to such team leader in the event of an emergency.

In the scheme of importance during the emergency situation, the next most important team members are located on the far left and far right sides of display 12. The team identified in block 42 on the far right side of display 12 will have a second level of importance. The team member identified in block 40 on the left side of display 12 will have a third level of importance. Those team member blocks such as 44 and 46, located between the most important team member block 30 and the second and third level blocks 40 and 42 assume lesser degrees of importance. As a matter of color coding, it has been found that eyes tend to gravitate first to the center of the display and then to the far sides of the display. In the present invention, the emergency action plan 10 prioritizes the team members and displays the team members in accordance with natural ergonomic and psychological considerations.

It can be seen that blocks 42, 44, and 46 have a smaller size and less solid shading than the block of the most important team member 30. The size and the shading of these blocks is designed so as to emphasize the fact that these team members are important, but not so important as the main team member. Once again, the design of these lebser levels of team member blocks is for the purpose of prioritizing the importance of the emergency action teams in accordance with ergonomic considerations.

An additional step in this prioritizing process is to identify these teams of lesser importance with a color whose brilliance corresponds to the level of importance. As illustrated in FIG. 1, the team member shown in block 40 is given a header color of light brown. Similarly, the team member of block 42 is given a red color. The team member of block 46 is given a green color. These colors are illustrated with the cross-hatching pattern shown in the header blocks. Other team members of lesser priority are given less prominent solid colors such as pink, orange, brown, light blue, light green, and turquoise. The colored cross-hatching and making of the blocks is in accordance with standard Patent office practice for designating color in block-and-white drawings.

Each team member block has an action line 16 extending vertically downward from the rectangular blocks 18. The most prominent team member block 30 has solid thick action line 50 extending vertically downward through the middle of display 12. This solid thick line represents the course of action required of the most prominent of the emergency action teams. The movement from top to bottom along this line is in the order that the action should be taken.

Action indicator blocks 20 are connected by the action lines 16 to the team member blocks 18. These action indicator blocks inform the team members of the particular tasks to be performed during the emergency situation. These action indicators comprise action step blocks 54, decision step blocks 56, and stop action blocks 58. The action blocks 54, the decision blocks 56, and the stop action blocks 58 are tied together to pictorially describe the actions by means of action lines 16 with arrow heads indicating the path through the emergency action plan 10 on display 12. The action step blocks 54 are signified by an enclosed geometric shape with parallel top and bottom lines and an "arrow", or intersecting diagonal lines on the ends of the top and bottom lines. These action blocks include words to describe the action to be taken. Another type of action block 60 has a similar shape to the other action blocks 54 but includes a third internal horizontal parallel line which is colored in the top action part and is uncolored in the bottom part of the action block for the purposes of emphasizing an important phone number.

The decision block is represented by a different enclosed geometric shape than the action step blocks 54. Specifically, the decision blocks 56 are shown as a triangle. The decision step blocks will include words indicating the need to make a decision as to a certain course of action.

The stop action blocks 58 also have a different geometric shape than the action blocks 54 or the decision blocks 56. Specifically, the stop action blocks 58 are characterized by an octagonal shape resembling a stop sign. The stop action block will inform the particular emergency action team to take no positive action.

With regard to the action indicators, each of the action indicators is colored with the same color as the particular team member block 18 from which it extends. In this manner, each of the team members can see at a glance the actions that are necessary for that team member to take during an emergency situation. It also serves to emphasize to the particular team member the course of action that he should take during the emergency situation. This eliminates a lot of the needless clutter of interacting groups or overlapping instructions.

In addition to the primary team member blocks 18, there are also "alternate" team member blocks 62. For example, as illustrated in FIG. 1, the alternate team member blocks 62 are connected by a broken action line 64 to the team member block 30. The alternate team member blocks as shown in FIG. 1 should have a rectangularly shaped block of the same size as the primary team member block 30 that the alternate team members can represent. As will be illustrated hereinafter, the shading around the rectangular block 62 should be of slashed lines, rather than the solid shading for the primary team member 30. The broken action lines 64 connect the primary team member 30 to the alternate team member 62.

At the top of the display 12 below the emergency icon 14 and the primary team member block 30 is an area 64 of the emergency action plan that shows response to the initial discovery of an emergency. For example, action line 24 indicates that the spill is discovered by the outside source indicated non-team member block 66. The action line 26 indicates that the spill was discovered by offshore personnel of the company. These offshore personnel are represented in team member block 68. Block 68, and the action indicators connected by action line 70 to team member block 68 are given very subtle, dull colors, such as grey, charcoal, purple, or maroon so as to deemphasize the role of the personnel of team member block 68 in the response operation. It can be seen that the team member block 68, which designates the employer's workers and the supervisory personnel, is drawn relatively small without much shadow around the block. This was done to deemphasize the relative importance of these personnel in the response plan.

Any non-team members that are shown on the emergency action plan 10, such as testing labs, equipment suppliers of clean-up equipment, or suppliers of workers to clean up the incident, are shown in smaller rectangular blocks in subtle grey colors or in light color crosshatching to show that they are different from the prominent bold solid colors of the response team of the company.

The emergency action plan 10, as shown on display 12, can stand alone to be used in an emergency as a sole means of instruction. The actions of each team member on the plan 10 is listed in priority from top to bottom along the vertical action lines 50. As such, the emergency action plan of the present invention provides step-by-step instructions to the individual team members. Given the clean nature of the emergency action plan, it is easy to avoid confusion, to avoid overlapping responsibilities, and it is easy to coordinate efforts between the various emergency action teams.

As used herein, the term "emergency action team" can refer to a single individual carrying out his assigned duties. For example, the emergency action leader identified in the large team member blocks 18 can have sole and total responsibility to carry out those actions shown in the action indicators connected by action line 16 to the emergency action leader's block. Alternatively, the term "emergency action team" can apply to a large number of personnel underneath an emergency action leader. As such, the person identified in the large rectangular team member blocks 18 acts as the team leader and has the responsibility of assuring that each of the steps connected by the action lines to the team member blocks 18 are carried out. The characterization of the "emergency action team" will vary depending on the nature of the emergency, the size of the organization, and the complexity of the tasks to be carried out.

Figure 2:
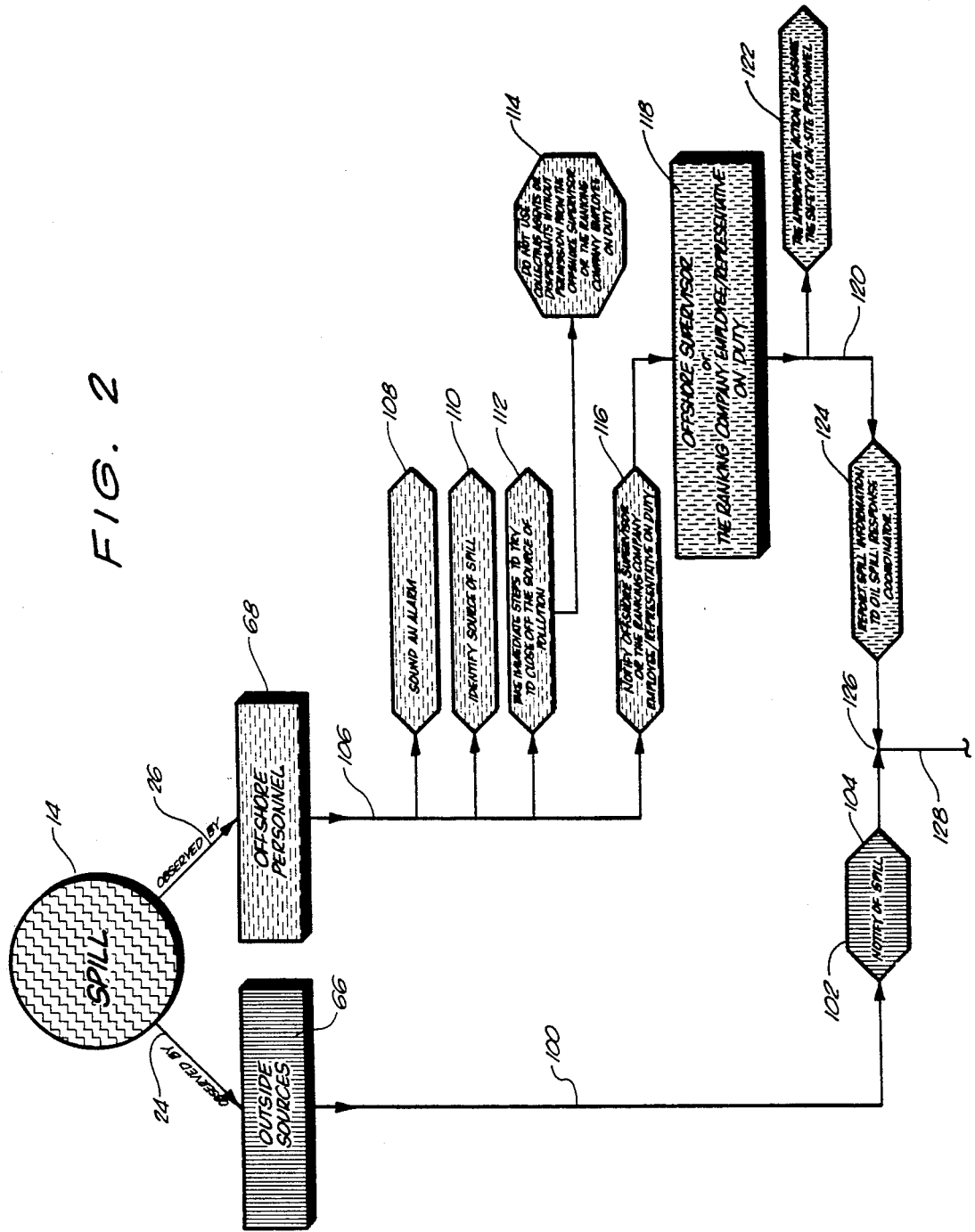
FIG. 2 is a detailed view showing a portion of an emergency action plan in accordance with the present invention.
Figure 3:
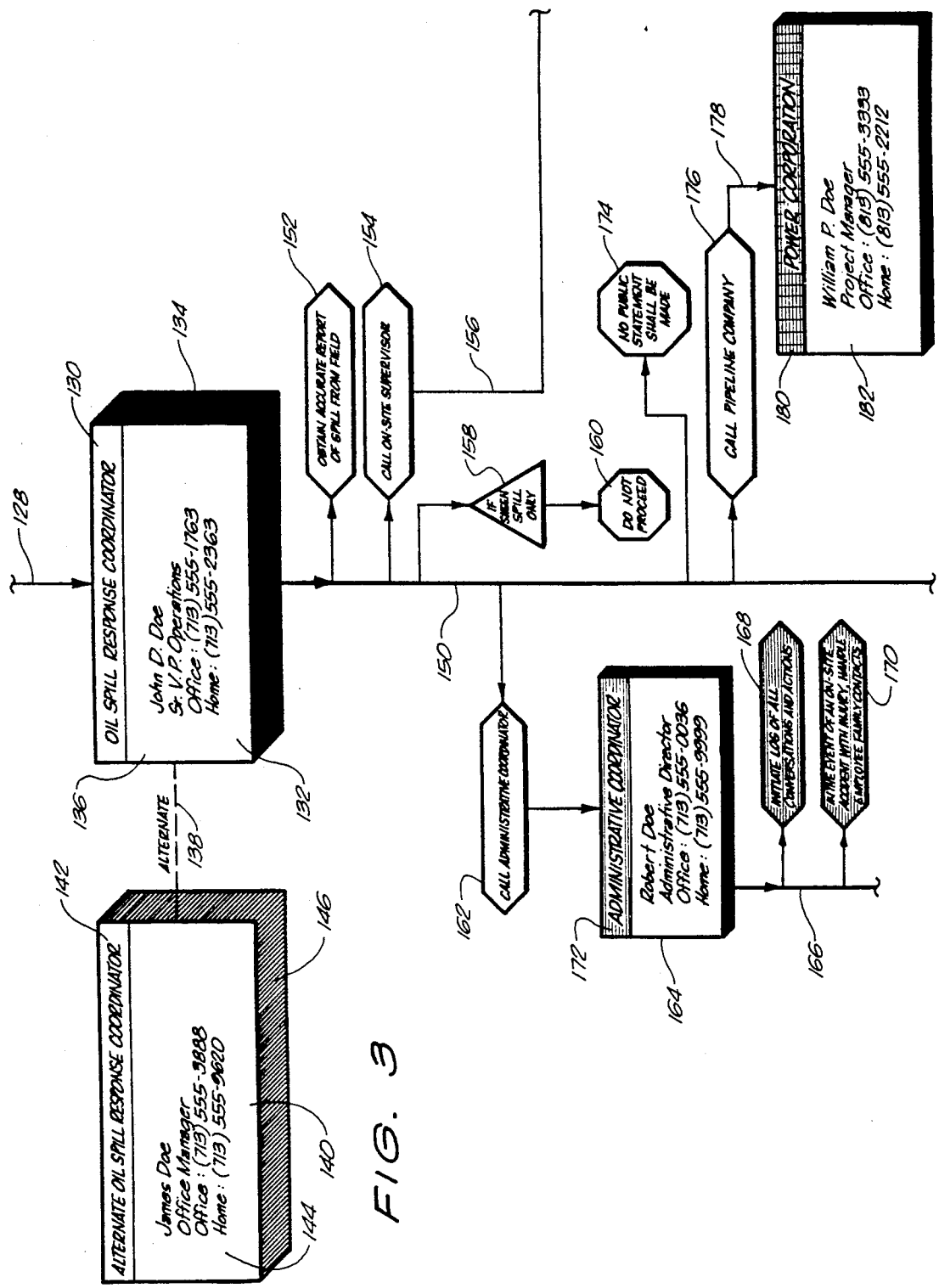
FIG. 3 is a continuation of the emergency action plan of FIG. 2 in accordance with the preferred embodiment of the present invention.

FIGS. 2 and 3 illustrate, with specificity, the operation of the emergency action plan in accordance with the present invention. Specifically, in FIG. 2, the emergency icon 14 indicates the nature of the emergency condition. In this case, a spill, either oil, chemical, or hazardous waste, has occurred. In the particular situation, the "spill" would be an offshore oil spill. Action line 24 extends from the emergency icon 14 and includes the words "observed by". Also, action line 26 extends from emergency icon 14 and includes the words "observed by". As such, the first determination, after the spill, is who saw and reported the spill. If the spill were observed by the outside sources shown in team member block 66, then the solid thick action line 100, extending vertically downwardly from the team member block 66 would lead to action step block 102. Action step block 102 has a color that matches the color of non-team member block 66. As such, it can be easily seen that the action step block 102 relates to the action of the "outside sources" identified in team member block 66. Action step block 102 indicates that the outside sources of block 66 notify someone of the spill. The blank portion 104 is incorporated into action step block 102 so that the information can be filled in as needed.

If pathway 26 is followed and the spill is observed by offshore personnel, then it is necessary to follow the solid thick action line 106. The first step of action would be indicated in the first action step block 108 extending horizontally from vertical action line 106. Action step block 108 indicates that an alarm should be sounded. Secondly, it is necessary to follow the action lines to action step block 110. Action step block 110 tells the offshore personnel to identify the source of the spill. Thirdly, the action line 106 leads to action step block 112. Action step block 112 informs the offshore personnel to "take immediate steps to try to close off the source of pollution". When following the step of action block 112, the offshore personnel of team member block 68 are told by stop action block 114 to refrain from using collecting agents or dispersents without permission. Finally, the action step block 116 is the last step to be followed by the offshore personnel of block 68. Action step block 116 tells the offshore personnel to notify the offshore supervisor. It should be noted that the action step blocks 108, 110, 112, 114, and 116 shall have the same dull grey color as that of the team member block 68. The dullness of the color, as stated previously, is for the purpose of deemphasizing the role of the offshore personnel, in general, in the response to the emergency condition.

In compliance with the requirements of the action block 116, the offshore personnel will notify the "offshore personnel or the ranking company employee/representative on duty" as shown in team member block 118. The first step that the offshore supervisor should take would be to follow action line 120 and take the action specified in action block 122. The next step along action line 120 informs the offshore supervisor by way of action block 124. Action block 124 requires the offshore supervisor to report the spill information to the oil spill response coordinator. It should be noted that the offshore supervisor block 118 has a brighter color than the offshore personnel block 68. The block 118 has a brighter color so as to place more importance to the activities of the offshore supervisor relative to the response to the emergency. Similarly, action blocks 122 and 124 will have the same color as team member block 118.

At point 126, the action line 100 and the action lines 106 and 120 meet. As such, regardless of whether the spill is observed by outside sources or by offshore personnel, the emergency strategy will be to follow action line 128 into FIGURE 3. Action line 128 is directed to the team leader of most importance in the emergency action plan. This person is entitled the "oil spill response coordinator". The title of the person is identified in the header area 130 of block 132. Block 132 has a solid bold shading 134 around its exterior edges. The name, title, and telephone numbers of the oil spill response coordinator is identified in the blank area 136 of block 132. Since block 132 is located in the middle of the display, has a large size, and has bold shading, it is easy to identify as the block of the person of most importance in the emergency response. This indication is further enhanced by the yellow coloring (not shown) of the header area 130 of block 132.

it is important that the emergency action plan have alternates to these very important positions. If the person identified in the blank area 136 of block 132 is not available, then it is necessary to identify an alternate team leader. To enhance the ability to identify this alternate team leader, broken action line 138 extends from the block 132 to block 140. The header area 142 of block 140 will have the title "alternate oil spill response coordinator" imprinted therein. The name of the alternate is included within the blank area 144 of block 140. To emphatically emphasize that this is the block of an alternate, the shading around the rectangular block 140 is by means of slashed lines 146 rather than the solid shading for the primary team member of block 132.

In keeping with the emergency action plan, it is necessary to follow the path of primary importance extending vertically downwardly along the thick solid action line 150 from the block 132. The action step block 152 requires that the oil spill response coordinator obtain an accurate report of the spill from the field. Secondly, action block 154 requires that the coordinator "call on-site supervisor". Another action line 156 directs attention to the information to be discussed with the on-site supervisor. Such information would be represented by action blocks at the end of action line 156. Thirdly, the oil spill response coordinator will follow action line 150 to decision block 158. If the spill is only a "sheen spill", then the action line extending from decision block 158 will direct the response coordinator to stop action block 160. Stop action block 160 informs the response coordinator to not proceed further. On the other hand, if the condition of decision block 158 does not occur, than it is necessary to continue along the action line 150 so as to call the administrative coordinator as indicated in action block 162. The name, address, and telephone numbers of the administrative coordinator are identified in team member block 164. Since the administrative coordinator is of lesser importance than the response coordinator, the shading around the block 164 is much less than the shading around the team member of primary importance. After the administrative coordinator is contacted by the response coordinator, the administrative coordinator must carry out his tasks in accordance with those identified along action line 166. Action line 166 will extend vertically downwardly so as to identify the steps to be taken by the administrative coordinator in response to the spill. Since the administrative coordinator is of less importance than the response coordinator, the color of the team member block 164 will be of a less prominent color, such as blue, than that of the oil spill response coordinator block 132. Also, the action blocks 168 and 170 beneath the administrative coordinator block will be of the same color as the header area 172 of block 164. In the manner illustrated in FIG. 3, the proper response is being carried out since the administrative coordinator is given his tasks at the proper time after all the proper decisions are made by the oil spill response coordinator in accordance with the procedures set out by the emergency response plan. There are definite designated responsibilities and a designated order and authority provided by the emergency action plan of the present invention.

After contacting the administrative coordinator pursuant to action block 162, the response coordinator must then refrain from issuing a public statement in accordance with the stop action block 174. The response coordinator must then call the pipeline company 176. So as to make the task of calling the pipeline company a simple procedure, the action line 178 directs the response coordinator to the person of authority within the pipeline company. The pipeline company's name is included within the header area 180 of block 182. Since the pipeline company is a "non-team member", the header block 180 includes light color cross-hatching so as to show that the pipeline company is different from the colors of the company's response team.

The patterns and examples shown in FIGS. 2 and 3 extend much further in the manner of FIG. 1. The examples shown in FIGS. 2 and 3 are simply examples illustrating the emergency action plan of the present invention. The inventive nature of the present emergency action plan lies in its coordinated ability to illustrate task assignment, task coordination, and authority during emergency situations. The scheme and layout of the emergency action plan of the present invention enhances the ability of a company to respond to emergency situations. The present invention eliminates the mass confusion that can occur in emergency situations.

The emergency action plan of the present invention is a dynamic scheme. Since employees are constantly changing jobs and changing positions, it is a constant effort to update the information contained within the emergency action plan. The change of information can be done simply and easily on the CAD computer program. As such, the color-illustrated emergency action plan of the present invention can be easily modified at relatively low cost. There is no need for four color printing processes, for offset printing, or other complex printing tasks. The emergency action plan can be updated almost immediately in response to changes of position. If the updating of information remains constant, then there should be no confusion or difficulty in locating the proper personnel during the emergency situation.

The emergency action plan of the present invention is adaptable to a wide variety of emergency situations. The individual duties of each of the emergency action teams can be isolated from the overall plan by simple programming efforts. As such, each member of the emergency action team can easily study the tasks required. Since the emergency action plan can be mass produced, each company with the emergency action plan should be able to display the plan wherever necessary.

The foregoing disclosure and description of the invention is illustrative and explanatory thereof. Various changes in the details of the illustrated plan may be made within the scope of the appended claims without departing from the true spirit of the invention. The present invention should only be limited by the following claims and their legal alternatives.

I claim:

1. An emergency action plan for coordinating the activities of emergency action teams during an emergency condition comprising:
   a display;
   an emergency icon supported by said display, said emergency icon for the identification of said emergency condition;
   a plurality of action lines extending downwardly on a surface of said display from said emergency icon, said action lines for directing the steps to be carried out in said emergency condition;
   a plurality of team member blocks supported by said display and connected to said action lines on said display, said team member blocks for identifying the emergency action team for a particular task in said emergency condition; and
   a plurality of action indicators connected by said action lines from said team member blocks, said action indicators positioned on said display for informing of the particular tasks to be performed by an emergency action team during said emergency condition.

2. The emergency action plan of claim 1, each of said team member blocks having a rectangular shape, said team member blocks varying in visual prominence relative to the importance of the emergency action team during said emergency condition.

3. The emergency action plan of claim 2, most important of said team member blocks being positioned in the middle of said display.

4. The emergency action plan of claim 2, the most important of said team member blocks having a rectangular block shape with shading along one surface of said rectangular block shape.

5. The emergency action plan of claim 1, said team member blocks having a header area for containing the title of the person of responsibility of an emergency action team identified in said team member blocks.

6. The emergency action plan of claim 3, the second and third most important emergency action teams being indicated by team member blocks positioned on the left and right sides of said display relative to the team member block of the most important emergency action team.

7. The emergency action plan of claim 2, the importance of an emergency action team identified in a team member block corresponding to the brightness of color of said team member block.

8. The emergency action plan of claim 1, said plurality of action lines comprising:
   a solid thick action line extending vertically downward on said display from said team member blocks.

9. The emergency action plan of claim 1, said action indicators extending horizontally outwardly from said solid thick action line below said team member blocks.

10. The emergency action plan of claim 9, said action indicators extending outwardly from said solid thick action lines having a color matching said team member blocks.

11. The emergency action plan of claim 1, said action indicators comprising:
    an action step block characterized by an enclosed geometric shape, said action step block for describing action to be taken during said emergency condition;
    a decision step block characterized by a different enclosed geometric shape than said action step block, said decision step block for indicating the nature of a decision to be made in said emergency condition; and
    a stop action block characterized by a different geometric shape than said action step block, said stop action block indicating the need to take no action during said emergency condition.

12. The emergency action plan of claim 11, said action step block comprising parallel top and bottom lines with intersecting diagonal lines at the ends of said top and bottom lines, said action step block having a color matching color of the team member block from which it connects.

13. The emergency action plan of claim 11, said decision step block being in the shape of a triangle, said stop action block having the shape of an octagon.

14. The emergency action plan of claim 11, said action indicators being more brightly colored toward the middle of said display than on the sides of said display.

15. The emergency action plan of claim 1, further comprising:
    an alternate team member block of rectangular shape positioned on said display adjacent one of said plurality of team member blocks, said alternate team member block connected to one of said plurality of team member blocks by a broken line.

16. The emergency action plan of claim 1, further comprising:
    a non-team member block of rectangular shape connected on said display by an action line to an action indicator, said non-team member block characterized by a top stripe of cross-hatched color of a different color than the color of said action indicator to which it is connected.

17. The emergency action plan of claim 1, said display having a size greater than 11 inches by 17 inches.

18. An emergency action plan comprising:

a display;

an emergency icon supported by said display at the top of said display for identifying an emergency condition;

a plurality of action lines extending downwardly on said display from said emergency icon, said action line directing the steps to be taken in said emergency condition;

a plurality of team member blocks of desired color, each of said team member blocks indicating a team leader of an emergency action team, the importance of one team member block in relation to another team member block corresponding o the brightness of said desired color, the team member block of most importance being affixed to a center of said display; and a plurality of action indicators connected to said action lines, said action indicators for detailing the particular tasks to be performed, each of said plurality of action indicators corresponding in color to the color of a particular team member block to which it is connected, said action indicators supported on a surface of said display.

19. The emergency action plan of claim 18, said plurality of action lines comprising:

a solid thick action line extending vertically downwardly on said display from said plurality of team member blocks, said action indicators extending horizontally outwardly from said solid thick action line below said team member blocks.

20. The emergency action plan of claim 18, said action indicators comprising:

an action step block characterized by an enclosed geometric shape, said action step block for describing the action to be taken during an emergency condition;

a decision step block characterized by a different enclosed geometric shape than said action step block, said decision step block for indicating the nature of a decision to be made in said emergency condition; and a stop action block characterized by a different geometric shape than said action step block, said stop action block for indicating the need to take no action of a particular type during said emergency condition.

* * * * *